United States Patent Office

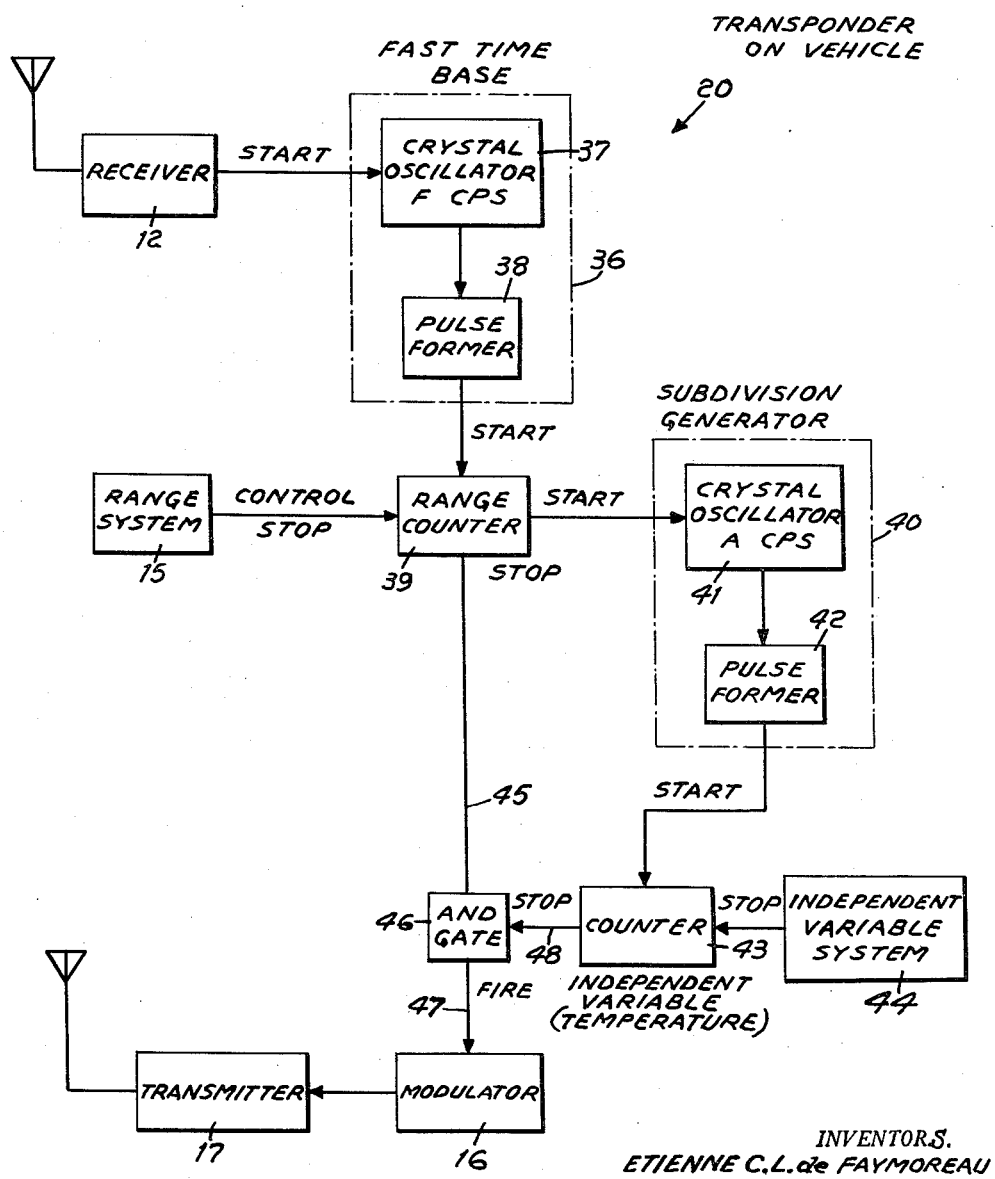

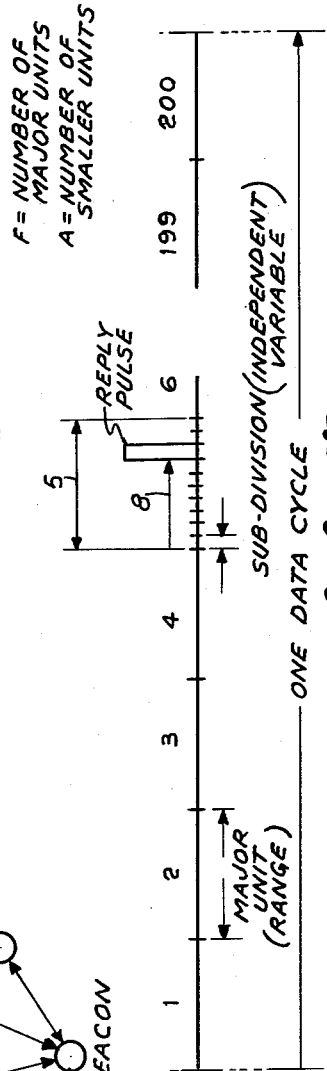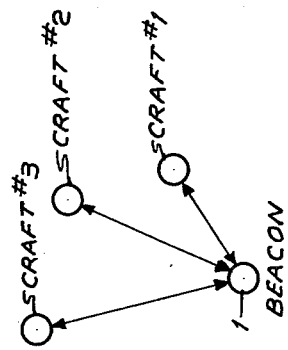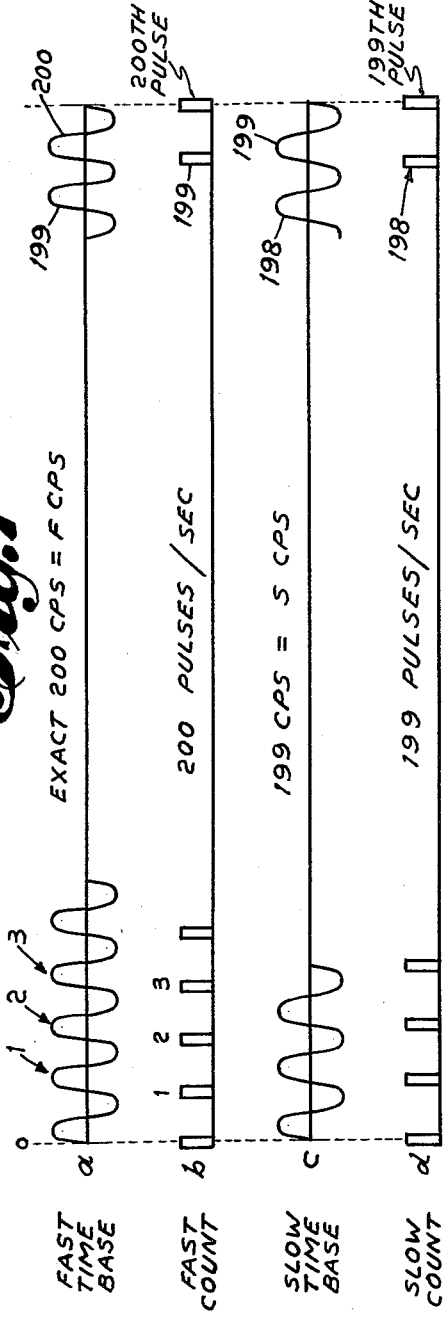

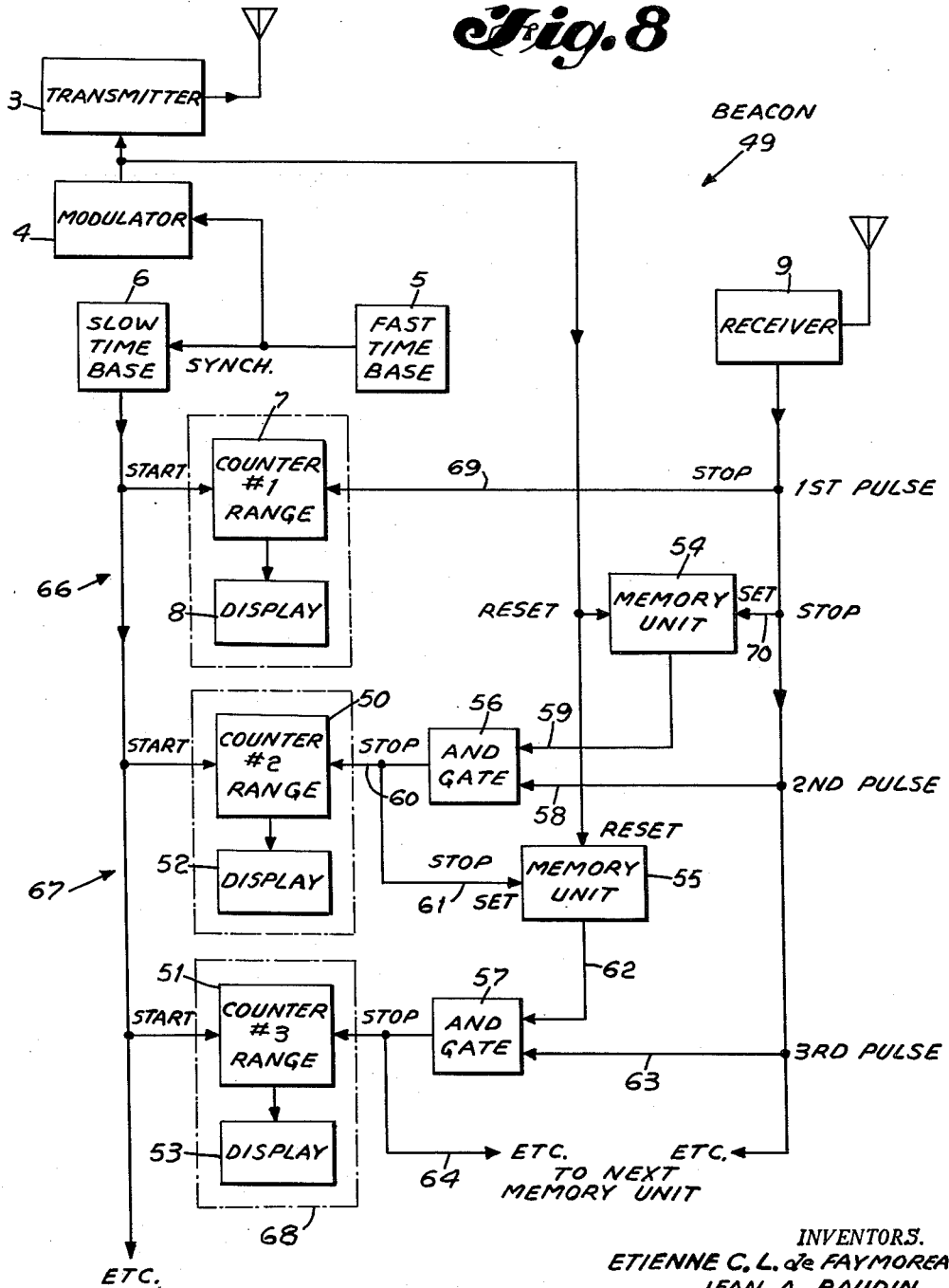

3,051,948
Patented Aug. 28, 1962

3,051,948
DELAY COMPENSATION IN TELEMETERING
SYSTEMS
Etienne C. L. de Faymoreau, Nutley, and Jean A. Baudin, Montclair, N.J., assignors to International Telephone and Telegraph Corporation, Nutley, N.J., a corporation of Maryland
Filed July 22, 1960, Ser. No. 44,779
10 Claims. (Cl. 343—103)

Our invention relates to telemetering systems and more particularly to methods for eliminating errors caused by propagation delay.

In the past, communication between two points by means of pulse position modulation has been known. Pulse position modulation conveys information by the particular location of the pulses within a given reference medium. In the present invention, the position of the pulses are located with respect to time. In the prior art devices, the methods used to establish the required time reference have been wasteful of bandwidth and have not lent themselves to convenient use where a number of distant transmitters attempt to communicate with one central station. One technique used in the prior art to establish a time reference for use in a time pulse position modulation system is to send a first pulse or pilot pulse to establish the origin of the time reference. Information is then conveyed by the elapsed time between this pilot pulse and a second information pulse. Although such a system operates, it has many serious disadvantages. The first disadvantage is that the required bandwidth of such a system is just double what would be required of a system which could transmit information without the use of a pilot pulse to establish the time reference. A second major disadvantage of such prior systems is the fact that when communication is to be made from more than one remote point to a central point, the equipment at the central point experiences great difficulty in distinguishing between the communications from the several remote points.

In the prior art systems, it has been known to transmit one type of data utilizing two pulses as explained above. Such a use of two pulses is also wasteful of the available capacity of such a pulse position communication system. The prior art devices which have utilized a single pulse to transmit information have suffered from serious errors in the information transmitted due to the finite time of propagation between remote points. This time of propagation or delay has further prevented prior art equipment from utilizing the full information capacity of a pulse position system.

Therefore, it is an object of the present invention to provide a telemetering communication system which utilizes only one pulse to convey the information.

It is a further object of our invention to provide a communication system which can transmit two unrelated types of information utilizing only a single pulse.

It is another object of this invention to automatically correct for any errors in communication caused by delay due to propagation time.

It is a feature of this invention to provide a communication system with a beacon and at least one remotely located transponder, the beacon and transponders each utilize a different distinct time base for measuring information so that delay due to pulse propagation is incorporated in the information exchanged between transponder and beacon without affecting the integrity of the information.

It is another feature of this invention to provide a system for pulse communication between a centrally located beacon and a plurality of remotely located transponders. The transponders are triggered by interrogation pulses sent from the beacon to send back reply pulses. By utilizing a first time base and a first subdivision generator located in the transponder, the reply pulse sent from the transponder carries information concerning two independent variables. The beacon contains a second slower time base and a second slower subdivision generator which extract and present separately the values of the two independent variables sent in the single reply pulse from the transponder.

The above-mentioned and other features and objects of this invention will become more apparent by reference to the following description taken in conjunction with the accompanying drawings, in which:

FIG. 5 is a block diagram illustrating in some detail the equipment located in a transponder on the craft for co-operation with the equipment shown in FIG. 4;

FIG. 6 is a timing diagram illustrating the transmission of two types of data with one pulse;

FIG. 7 is a series of timing diagrams illustrating the operation of FIGS. 4 and 5; and FIG. 8 is a block diagram illustrating the equipment at the beacon for use when a plurality of craft are to be accommodated.

FIG. 9 shows the arrangement for a plurality of aircraft when the system of FIG. 8 is used.

Figure 1:
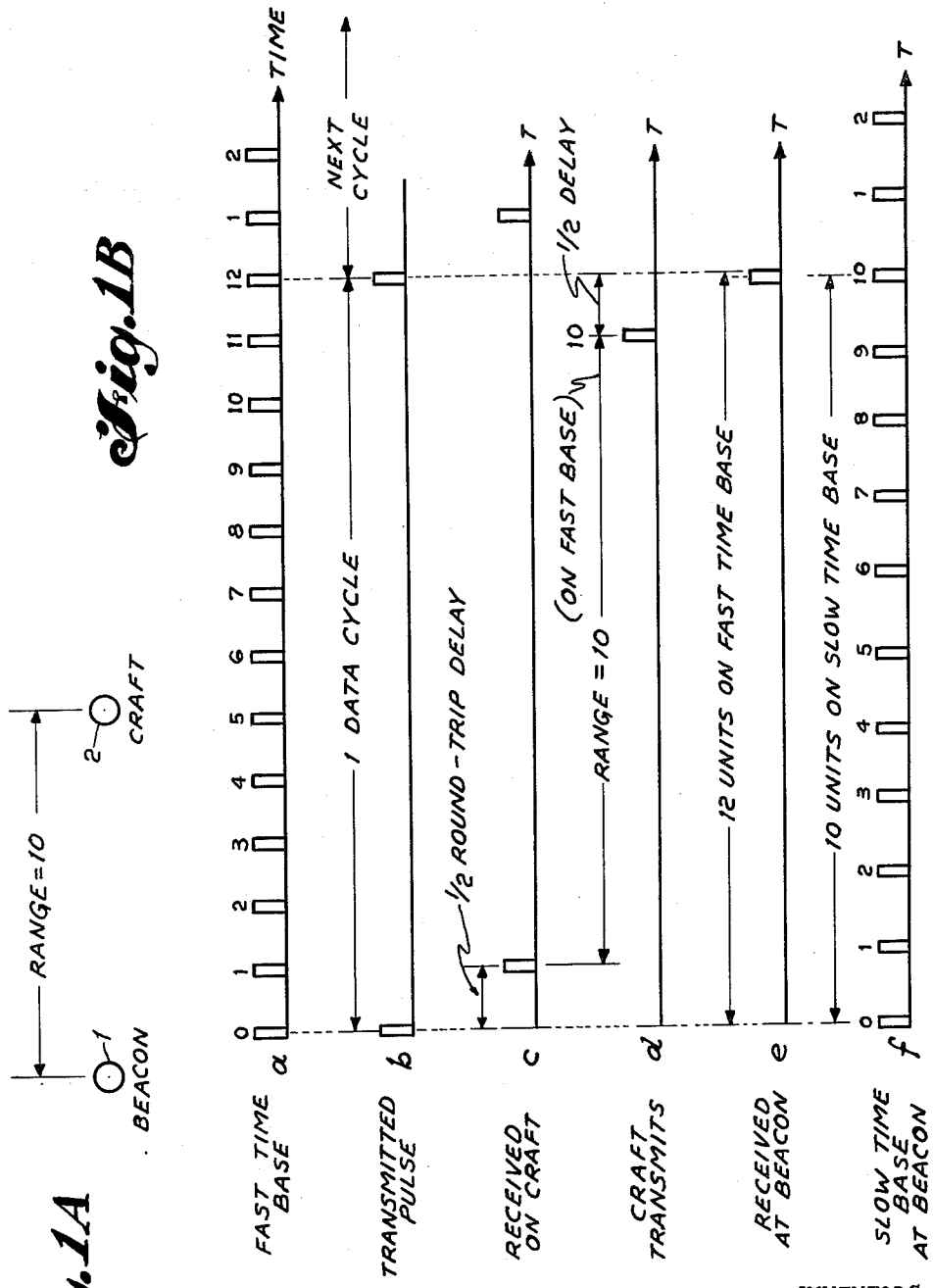
FIG. 1A illustrates the basic arrangement of the system.
FIG. 1B is a group of timing diagrams illustrating the operation of the system.

Referring to FIG. 1A, a beacon 1 and a craft 2 are shown. At the instant of interest, the beacon 1 and the craft 2 are separated by a certain distance or range. For the example shown here, a range of 10 units will be used. This range might represent 10 miles or 10 kilometers or whatever is a convenient unit of measurement. The scheme of operation to be used in communicating from the craft to the beacon is time pulse position modulation. In such a system, the number of units of time between a reference time and the occurrence of a pulse will represent the data to be transmitted. To transmit range, for example, we can divide time into data cycles. Within any one data cycle the length of time from the origin of the data cycle to the occurrence of a pulse will represent the particular range. Thus, if a pulse occurs after 4 units of time from the origin, the range will be 4 units; in this case, for example, 4 miles or 4 kilometers. A range of 10 miles would be represented by the occurrence of the pulse after 10 units of time as measured from the origin of the data cycle. Such a scheme works very well if the two pieces of equipment communicating can communicate with practically no delay in their communications. In almost any practical case, however, it will require a finite length of time for pulses to pass between the beacon 1 and the craft 2 or vice versa. This finite delay introduces serious errors in the data which is communicated.

For example, if electromagnetic waves are used for communication, there will be a delay of approximately 12.4 microseconds per radar mile. The 12.4 microseconds is the time required for electromagnetic waves to travel from a given point one mile and then return to the same point. Thus, one radar mile is actually a round trip mile representing a complete distance of two miles. If communication is through the medium of air by means of sound waves, for example, the delay would be approximately one second per 1100 feet of distance. The principles taught and embodied by our invention are equally applicable no matter what type of medium is used for the pulse communication between the remote points. Refer to FIG. 1B. FIG. 1B, curve a, is called a fast time base. It is the reference base or the "measuring stick" for our communication system. One complete data cycle is shown as consisting of 12 equally spaced pulses. This data cycle could have any convenient period in time. For purposes of visualization, it is convenient to think of one data cycle as occupying one second in time. But the actual length of the data cycle can be selected for convenience. The scheme of communication to be used is this: The craft 2 has knowledge, by independent means, which are not part of this invention, as to what the range is from the craft 2 to the beacon 1. It is desired to know the range of the craft at the beacon as measured at the craft 2.

FIG. 1B, curve a, shows the fast time base used as the reference for this system. There are twelve equally spaced pulses during one data cycle. The scheme of operation is as follows. The beacon 1 transmits a pulse, as shown in curve b, once every data cycle. This pulse is an interrogation pulse for the craft 2. The total delay when the craft is at the maximum system range of 10 units is two units as measured on the fast time base, one unit on the way from the beacon 1 to the craft 2 and one more unit of time for the return trip from the craft 2 back to the beacon 1. Thus, as shown in curve c, the pulse transmitted from the beacon 1 arrives at the craft after one unit of time. Equipment on the craft 2 then begins to count off 10 units of range as measured at the craft on the fast time base in preparation for sending a reply back to the beacon 1. The equipment on the craft 2 begins counting from the time of receipt of the pulse sent by the beacon, as shown in curve c. Curve d shows that the equipment on the craft 2 counts at the same rate as the fast time base as shown in curve a. Thus, at the end of 10 units, representing 10 units of range, the craft's transmitter emits a pulse to be sent back to the beacon 1. However, the beacon 1 does not receive the pulse from the craft until one more unit of time later due to the one unit of delay on the way back. Thus, curve e shows the time when the beacon 1 receives the reply pulse from the craft at the end of 12 units on the fast time base.

The beacon desires to find out the range of the craft, since the beacon has no independent way of knowing what the true range of the craft is. Hence, the beacon will count the range as 12 units of range, since 12 units of time have elapsed since the beacon sent a pulse out in interrogation and the craft sent a pulse back in reply. However, it can be readily seen that this measurement of the range is wrong by two units, namely, the two units of time which represent the round trip delay time of the pulses and which have adversely affected the accuracy of the range measurement. In this case, there are two parts error in 12 parts measurement or 16 percent error in range measurement. The basic principle of the present invention can be grasped by noting curve f. Curve f represents a second, slower, time base which is kept running at the beacon 1 and which is synchronized with the fast time base a. The slow time base f starts in synchronism with the fast time base a and at the end of one data cycle, it ends again in phase with the fast time base. But at other times throughout the slow time base period, the counts, or pulses, of the slow time base occur in general at different times than the pulses of the fast time base. Thus, if all the units of time are compared to the fast time base a, the slow time base f has only 10 units of measurement for one whole data cycle. Thus, the slow time base runs at five-sixths the speed of the fast time base. It will be seen that if the slow time base is set running at the same time that the pulse is transmitted from the beacon 1, and the time of reply of the pulse received from the craft is read off from the slow time base, the value which is read from the slow time base will be correct and will have automatically compensated for the errors in range introduced by delay. Thus, the slow time base reads 10 units of range when the pulse is received from the craft as shown in curve e. Although this is twelve actual units of time as measured by the fast time base, when the slow time base is read to measure range, it represents 10 units of range and is hence correct for the range measurement, since it is basically desired to measure range and not the elapsed time between pulses. It can also be seen that if the craft were at a range of five miles, for example, the fast time base would read 6 miles when the pulse is received back at the beacon. However, the slow time base will read 5 units of range which is the correct value. By placing a straight edge vertically across both curves of the two time scales, their relationship can be readily seen for any particular time.

Figure 2:
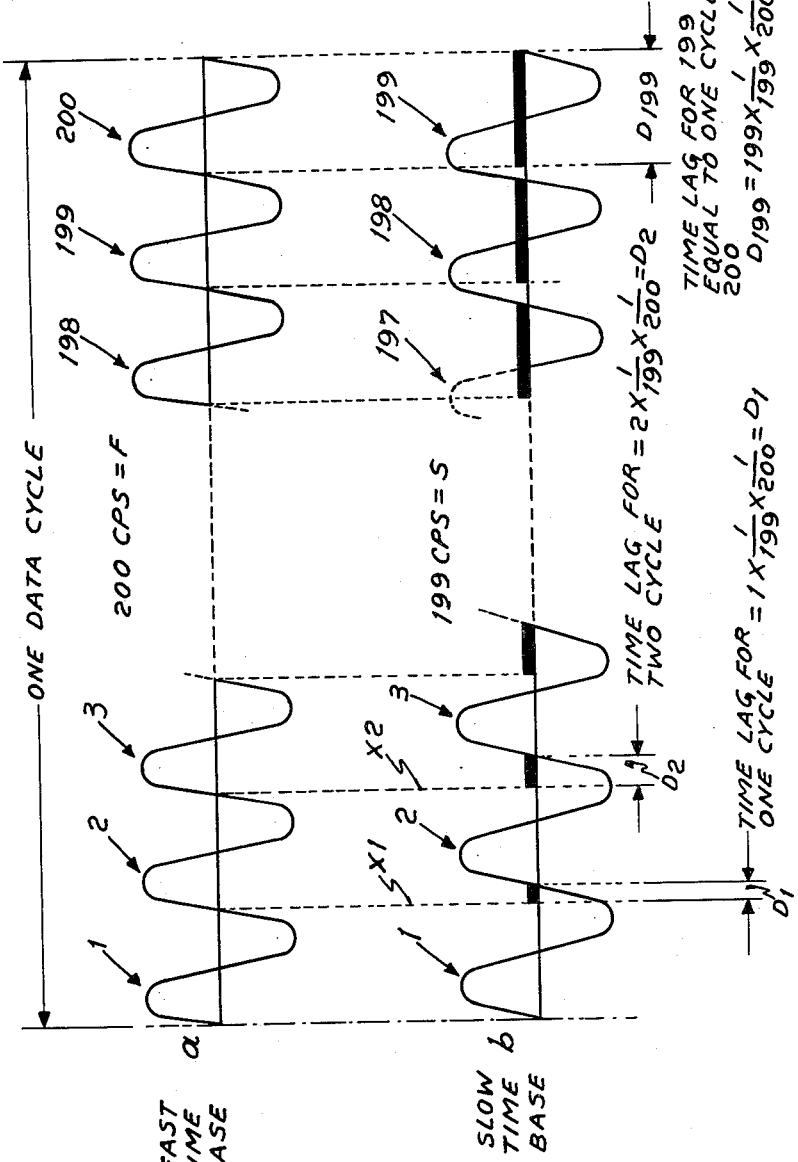
FIG. 2 is a greatly enlarged timing diagram illustrating a principle of the invention.

FIG. 2 is a more detailed explanation of the technique that was demonstrated in FIG. 1. In FIG. 2, curve a shows a fast time base or a reference base. For example, the fast time base might be at a frequency of 200 cycles per second. In other words, on the fast time base in one data cycle there are 200 complete cycles of the fast time base. The slow time base, however is running at a slightly slower frequency. For convenience in explanation, it is well to think of one data cycle as being a period of one second. Then, frequency of the waves can be discussed directly, but the length of the data cycle can be other than one second as will be readily apparent. Thus, if the slow time base, curve b of FIG. 2, is running at 199 cycles per second, this is exactly one cycle in one second less than the frequency of the fast time base. This means that over 199 cycles of the slow time base, the slow time base has made a delay or a loss of one complete cycle of the fast time base. Thus if we examine the line drawn vertically from the end of the first complete cycle of the fast time base, the line shown as X1 for example, it will be seen that at the end of one cycle of the fast time base, the slow time base has not quite completed the complete cycle of its own frequency. In fact, the slow time base does not finish a complete cycle until a very short time period later. This time period is shown as D1, the delay for one cycle. If we examine the two curves again, at the end of two complete cycles of the fast time base, on the line shown as X2, again we see that the slow time base has not made two complete cycles and, in fact, it has fallen somewhat farther behind than it was at the end of the second cycle. This second delay is shown as D2, and D2 is exactly twice as long as D1. Thus, the slow time base falls progressively and cumulatively farther and farther behind the fast time base as measured along the slow time base. At the end of say z cycles of the slow base the time delay between the two waves is $$z \times \frac{1}{199} \times \frac{1}{200}$$

in seconds since each cycle of the fast time base represents one two-hundredths of a scond. At the end of 198 cycles of the slow time base, the slow time base is $$\frac{198}{199} \times \frac{1}{200}$$

of a second behind the fast time base. At the end of 199 cycles of the slow time base, the slow time base is again in exact correspondence in both amplitude and phase with the fast time base. This is the end of one data cycle. At the end of the 199 cycle, the slow time base has actually lost one complete cycle relative to the fast time base. This difference in frequency, which produces a gradual difference in delay between the two waves, allows the automatic correction for propagation delay to be accomplished as was demonstrated in FIG. 1. The use of exactly an integral number of cycles difference between the fast time base frequency and the slow time base frequency allows sine waves to be used as the time base waveform. By using an integral number of cycles difference the two time bases can be kept synchronized with virtually no loss of time for synchronizing.

Figure 3:
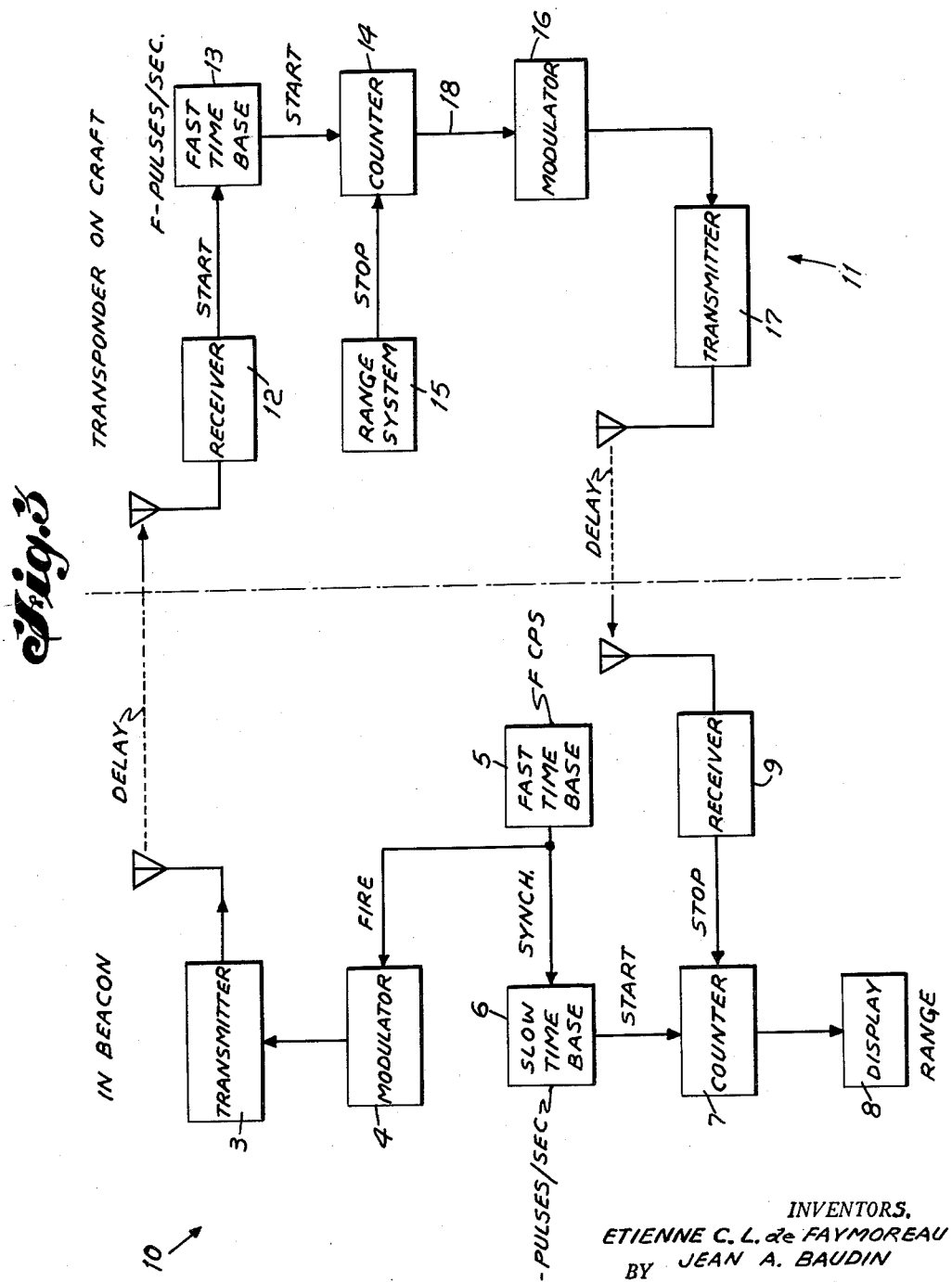
FIG. 3 is a block diagram of the complete system.

FIG. 3 shows an embodiment of the invention suitable for use with virtually any type of pulse communication system which utilizes time pulse position modulation to convey the information. FIG. 3 may be visualized as a communication system utilizing electromagnetic waves propagated through the atmosphere. However, the system shown in FIG. 3 will work equally well with pulses of sound through air or with pulses of sound transmitted through water, as in a sonar system. To appreciate the practical nature of the invention, assume that electromagnetic waves are used through air. As shown in FIG. 2, assume that the fast time base is chosen as a wave of 200 cycles per second, in other words, 200 complete cycles in one data period where the data period is one second. One two-hundredths of a second represents 5,000 microseconds. Electromagnetic waves require 12.4 microseconds to travel a two-way round trip mile. Thus, if the 5,000 microseconds are divided by 12.4 microseconds, the range of the system will be given. This is 403 miles. The slow time base of 199 cycles per second is used. Thus, there is exactly one cycle difference between the fast time base and the slow time base. Hence, the maximum range that the system can accommodate is 403 miles, and there is one cycle difference between the fast time base and the slow time base. The delay per cycle will be $$\frac{1}{199} \times \frac{1}{200} = \frac{1}{199} \times 5,000$$

microseconds per cycle of the slow time base. This is equal to a delay of 25.125 microseconds per cycle of the slow time base. These calculations are conveniently tabulated in Table 1.

*Table 1*

One data period = 1 second

Fast base = 200 c.p.s. = F microsecond $\frac{1}{200}$ c.p.s. = .005 sec. = 5000 microseconds 5000 microseconds $\cong \frac{5000}{12.4}$ miles = 403 miles Slow time base = 199 c.p.s. = S Delay 1 cycle (slow) = $\frac{1}{199} \times \frac{1}{200} = \frac{1}{199}$ $\times 5000$ microseconds = 25.125 microseconds Maximum range = 403 miles 1 unit slow base = $\frac{403}{199}$ = miles/unit of slow base $\cong 2.025$ miles/unit of slow base FIG. 3 shows the equipment necessary to realize an electromagnetic communication system utilizing the principles explained above. The left-hand side of FIG. 3 shows the electronic equipment in the beacon 10. The right-hand side of FIG. 3 shows the electronic equipment in a transponder 11 located on each craft which utilizes the system. FIG. 3 shows a transmitter 3 which is keyed by a modulator 4. The modulator 4 and the transmitter 3 may be one of a number of types well known in the electronic art. Thus if 3 is a CW transmitter, modulator 4 can key the transmitter by shifting the frequency of the transmitter during the duration of the information pulse, for example. Transmitter 3 and modulator 4 can also be arranged so that the transmitter 3 emits no radiation at all until it is keyed by the modulator 4 which produces a pulse of appropriate amplitude and the desired duration when it is desired to transmit one of the interrogation pulses from the transmitter 3. The modulator 4 is controlled by a fast time base 5. This fast time base 5 operates at some convenient predetermined frequency, F cycles per second, during one data cycle. In this case for the example chosen, F would be 200 cycles per second. The general frequency of the fast time base 5 is shown as F cycles or F pulses per second. The modulator 4 is controlled to cause the transmitter to emit a pulse according to the fast time base 5. Thus, as shown in curve b of FIG. 1B, the transmitter 3 will emit one pulse each data cycle. In this case, there will be 200 units of time as measured on the fast time base 5 in one data cycle, instead of 12 as shown in FIG. 1B, curve a. There is also a slow time base, element 6, which is synchronized to the fast time base 5. Thus, slow time base 6 starts at the same time and in phase with the fast time base 5. However, the slow time base 6 runs at a somewhat slower frequency during one data cycle. In this case, the slow time base would operate at 199 cycles per second. The general frequency of the slow time base 6 is shown as S pulses per second or S cycles per second. The output of the slow time base 6 is introduced into a counter 7.

The counter 7 is started by the slow time base 6 at the same time that the fast time base 5 and the slow time base 6 start up in synchronism. However, the counter 7 counts 1 unit for each complete cycle of the slow time base 6. Thus, the counter 7 keeps a cumulative total of the number of cycles during one data cycle as measured by the slow time base 6. This counter 7 has connected to it an associated display unit 8 which provides for convenient visual or other display of the reading of the counter in whatever types of units are convenient, for example, binary numbers or decimal numbers. Display unit 8 might consist of neon lights to indicate binary numbers or it might consist of a device such as a digital voltmeter, for example, to present decimal numbers or it might present a display such as Nixie tubes, all of which are well known in the art. The counter 7 is started by the slow time base 6 and its rate of operation is determined by the slow time base 6. However, the output of a receiver 9 is shown connected to the counter 7, and the counter 7 is stopped by the output of the receiver 9. Thus, the equipment in the beacon consists essentially of a fast time base and a slow time base and a counter.

Pulses are transmitted from the beacon 10 under the control of the fast time base 5, but the elapsed time in the beacon is counted on a counter 7 at the rate of the slow time base 6. The counter 7 is stopped whenever the receiver 9 receives a pulse in answer from the transponder 11 located on the craft. On the right-hand side of FIG. 3 is shown a transponder 11. Transponder 11 consists of a receiver 12, a fast time base 13, a counter 14, a ranging system 15, a modulator 16 and a transmitter 17. The receiver 12 is adapted to respond to pulses emitted from the transmitter 3 in the beacon 10. When the receiver 12 receives the interrogation pulse, such as shown as curve b in FIG. 1B, from the beacon 10, the receiver 12 provides an output pulse which starts the fast time base 13 running. This fast time base 13 measures or counts time at exactly the same rate as the fast time base 5 in the beacon 10 and, in fact, it can be identical in construction. The fast time base 13 when it starts, starts the counter 14 totalling the cycles of the fast time in base 13 in the transponder 11 on the craft. Thus, when the transponder 11 receives the interrogation pulse from the beacon 10, the counter 14 is set into operation counting units of time at the rate of the fast time base 13 which is the same as the rate of the fast time base 5.

The ranging system 15 can be of many forms but it is basically a transducer which converts the range information which is independently available at the craft into a form suitable to stop the counter 14 at the correct measure of range. The range system 15 could be a radar type ranging system located on the craft or it might be one of the well known navigational pieces of equipment, such as the aircraft TACAN equipment or VOR-DMET distance measuring equipment, which is located on the craft. Ranging system 15 does not in itself constitute the novelty of the present invention. Counter 14 counts time at the rate of the fast time base 13 or 5 until the correct count representing the range at that instant is reached. The counter 14 is then stopped by the ranging system 15. At the instant that the counter 14 stops, the output 18 of the counter 14 causes the modulator 16 to trigger the transmitter 17 and send back the reply pulse which contains the information on range which is desired by the beacon 10. This is the basic type of operation which was explained in conjunction with FIG. 1B. While the pulse from the transmitter 17 is on the way back to the receiver 9 it again experiences the same delay which the pulse from the transmitter 3 experienced on the way to the craft receiver 12. In the meantime, the slow time base 6 and the counter 7 have been running in the beacon 10 from the instant that the transmitter 3 emitted the first interrogation pulse. When the reply pulse reaches the receiver 9, counter 7 is stopped by the output of the receiver 9. At this instant, the counter 7 reads the correct range as transmitted by the transponder 11 on the craft automatically corrected for the round trip delay which was involved. FIG. 1B, curve $e$, shows the pulse when it is received by the receiver 9 at the beacon. Curve $d$ shows the reply pulse when it was emitted by the transmitter 17 on the craft. In the example we are using, if the craft is at the maximum range of 200 units, there will be a round trip delay of one unit. This delay represents 5,000 microseconds according to the 200 cycle-per-second fast time base. Each unit of the counter 7 at the rate of 199 cycles per second represents 403 miles divided by 199 or slightly more than two miles per unit. Thus, if the craft is at the maximum range of 403 miles, the counter will read 199 units of range corresponding to 403 miles. There was one unit of time as the round trip delay time for the pulses. Thus, the fast time base 5 went through 200 units of range during the cycle but the slow time base 6 went through 199; hence, the counter 7 reads the correct range according to the slow time base 6 and the error in range due to the round trip delay has been eliminated. Thus, the reading of 199 on the counter 7 represents a disttance of 403 miles, the maximum range of the system. At any other range less than the maximum range, the delay will be directly proportionally less than the one unit delay at the maximum range. Thus the counter 7 according to the slow time base 6 will always read the correct range corrected for the round trip delay time. It can be seen that the frequency of the fast time base, the slow time base and the system maximum range can be picked for convenience. The example in connection with FIG. 1B showed the fast time base of 12 units per data cycle and the slow time base of 10 units per data cycle and the maximum range was 10 units of range. The only requirement upon the frequencies of the two time bases and the system maximum range is that it is very desirable to keep the difference between the fast time base and the slow time base an integral number of cycles. This is because it would be much more difficult to keep the fast time base and the slow time base synchronized at a fractional number of cycles.

For example, suppose the fast time base is picked as 1,000 cycles per second equal to F. Then let the maximum range of the system be 483.87 miles. Then the maximum time delay at the farthest range will be 483.87 miles times 12.4 microseconds per radar mile. The maximum round trip time delay is then 6,000 microseconds. Therefore, 6 cycles difference from the 1,000 cycles are needed for this slow time base for the counter 7. Therefore, the slow time base will be 1,000 minus 6 equal to 994 cycles per second. Thus, if a fast time base frequency of 1,000 cycles per second is used and a slow time base frequency of 994 cycles per second is used, a maximum range of 483.87 miles may be used utilizing electromagnetic transmission. Table 2 summarizes these calculations.

*Table 2*

Fast time base = 1000 c.p.s. = F $\frac{1 \text{ sec.}}{1000 \text{ c.p.s.}}$ = 1 millisecond = 1000 microseconds in 1 cycle of fast base time Let maximum range be 483.87 miles Then maximum time delay = 483.87 mi. × 12.4 microseconds per radar mile Maximum time delay = 6000 microseconds So 6 cycles less in 1000 cycles are needed for the display (slow) time base:

Slow time base frequency = 1000 − 6 = 994 c.p.s. = S

The method for extending this type of operation to any medium of communication is now obvious. The calculation is performed in the same manner except instead of using a delay of 12.4 microseconds per radar mile in the case of electromagnetic radiation, one second per 1100 feet would be used for sound in air and appropriate distance per second would be used for sound in water to calculate the delay and the number of cycles difference between the fast time base and the slow time base. The invention as described so far provides for the automatic elimination of errors in the measurement of range when the range is transmitted from a craft back to a beacon by means of time pulse position modulation.

Figure 4:
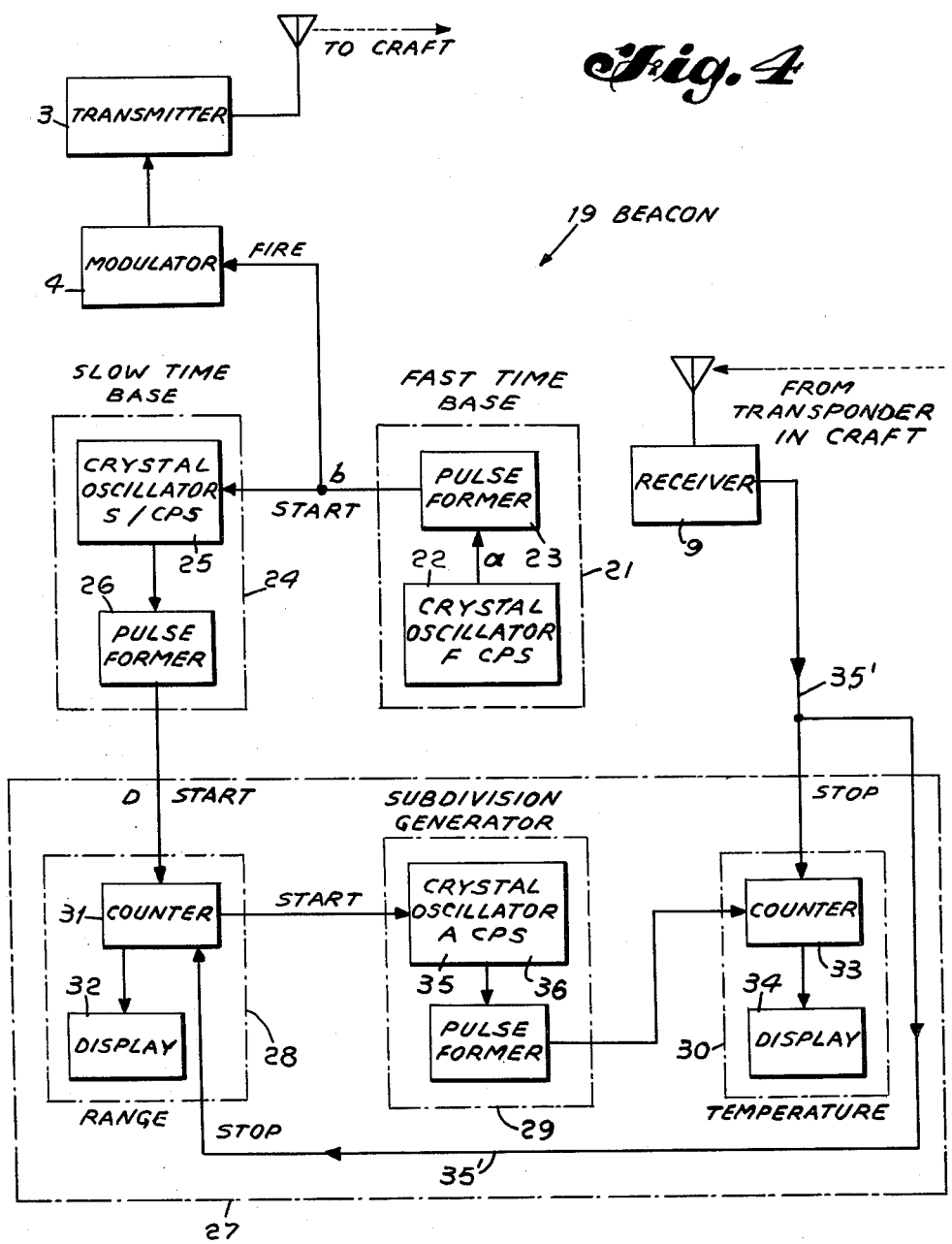
FIG. 4 is a block diagram of another embodiment of the invention showing in some detail the equipment located in the beacon.

FIGS. 4 and 5 show another embodiment of our invention which illustrates the extreme advantages to be obtained by utilizing this technique to transmit two independent variables by means of one pulse. FIG. 4 shows the equipment required in the beacon 19 for an electromagnetic communication system to transmit two independent variables, one of which is range and the other variable to be transmitted can be any quantity desired. In the example shown, we have picked the temperature as the data to be transmitted back to the beacon from the craft. FIG. 5 shows the transponder 20 which is on board each craft in the system for operation in conjunction with the beacon shown in FIG. 4. FIGS. 4 and 5 have the exact same relationship as the two halves of FIG. 3, and are shown as separate figures because of the additional complexity of the equipment. FIG. 6 illustrates the scheme of data transmission which enables one pulse to carry information concerning two independent non-related variables, such as range and temperature. The first variable, range, is transmitted in the same manner as illustrated in FIGS. 1 and 2 and the discussion above. One data cycle is divided into a convenient number of equal major intervals, for example, 200 intervals. Then, the pulse returning from the craft represents the range by placing the response pulse within the appropriate major interval. Thus, if the response pulse occurs in the 98th interval, this represents 98 units of range. For the examples chosen where the range was 403 miles maximum, the 98th interval respresents $$98 \times \frac{403}{199}$$

miles of range. FIG. 6, for example, shows the reply pulse occurring during the fifth range interval. In other words, the range is $$5 \text{ times } \frac{403}{199}$$

miles at this instant. However, each major unit which represents range is further subdivided into smaller intervals. In FIG. 6, 10 smaller intervals are shown for each major division; these are shown as subdivisions. The units of the subdivisions represent the independent variable, for example, temperature. Thus, each subdivision might represent 10 degrees centigrade. Thus, a pulse occurring in the fifth major unit at the eighth subdivision represents 5 units of range and 8 units of temperature, in this case, $$\frac{5}{199} \times 403$$

miles and 8×10 degrees per division or 80 degrees centigrade in temperature. Thus, it can be seen that one pulse has been so placed in time by pulse position modulation so that it represents two independent variables. If the temperature stayed the same, 80 degrees, and the range changed to say 64 units, then the pulse would occur in the 64th major interval at the eighth subdivision. If the temperature changed to 30 degrees centigrade and the range was 104 units, then the pulse would occur in the 104 major unit for range and at the third subdivision for 30 degrees in temperature. Thus, any combination within the system set up can be represented.

The great advantage of the present invention in its ability to measure the range by eliminating the delay errors is now apparent. If the delay errors in range were not eliminated, the information on the second variable, such as temperature, would be entirely meaningless and the errors due to delay would completely overwhelm any attempt to measure a second variable by using a subdivision of the major time interval. The equipment shown in FIGS. 4 and 5 utilizes the scheme shown in FIG. 6. FIG. 4 shows the beacon 19 which has a transmitter 3, a modulator 4, a fast time base 21. The fast time base 21 may consist of, for example, a crystal oscillator 22 running at F cycles per second, in this case, at 200 cycles per second. The output of the crystal oscillator 22 is introduced into a pulse former 23. The pulse former 23 forms a pulse once during each cycle of the crystal oscillator 22. This is illustrated in FIG. 7, curves $a$ and $b$. Curve $a$ shows a fast time base as a sine wave generated by the crystal oscillator 22. Each time sine wave $a$ crosses the zero axis rising in the positive direction, a pulse is formed by the pulse former 23. Such crystal oscillators 22 and such pulse formers 23 can take a variety of forms and they are well known in the electronic art and in themselves they do not form the novelty of the present invention. The pulse former 23 might consist of a blocking oscillator working in conjunction with the crystal oscillator 22. The particular form of the fast time base may take many other forms well known to those skilled in the electronic art. The output of the pulse former 23 is a stream of pulses occurring at the rate of exactly F pulses per data cycle, in this case, 200 pulses per data cycle or 200 pulses per second. The beacon 19 also contains a slow time base 24. The slow time base 24 may contain a crystal oscillator 25 and a pulse former 26. The construction of the slow time base 24 is exactly the same as that of the fast time base except that the crystal oscillator 25 of the slow time base 24 operates with the appropriate smaller number of cycles during each data cycle, in this case at 199 cycles per second. This simply involves the use of a somewhat different standard crystal for the slower time base and the crystal oscillator 25 and the pulse former 26 can be otherwise the same as that shown in the fast time base 21. The output of the pulse former 26 will be a stream of pulses equally spaced throughout one data cycle and occurring at the appropriate rate, slower than the rate of the fast time base. In this case, the slow time base will put out 199 pulses per data cycle. This is shown as curves $c$ and $d$ in FIG. 7.

The output of the slow time base 24 is fed into a counting unit 27. This counting unit is somewhat different from the counting unit 7 shown in FIG. 3. The counting unit 27 has a range part 28, a subdivision generator 29 and an independent variable part 30. The independent variable part 30 will measure and display the second independent variable; in this case, temperature is used as an example. The range part of the counting unit 28 consists of the counter 31 and a display unit 32. The independent variable part 30 also consists of a counter 33 and a display unit 34. The subdivision generator is very similar to the fast time base 21 and may consist of the crystal controlled oscillator 35 and a pulse former 36. However, the frequency of the crystal oscillator 35 of the subdivision generator is picked to have the appropriate number of subdivisions which was chosen for operation with the system in question. The illustration of FIG. 6 showed 10 subdivisions for a major unit. Hence, in that case, the subdivision generator would operate at the rate of 10 cycles per major unit, that is, 10 times 199 cycles per second equals 1990 cycles per second. For the present illustration of FIG. 4, the major units might be divided into 360 subdivisions for example so that temperature in degrees centigrade could be displayed over a range zero to 360 degrees centigrade. Thus, the crystal oscillator 35 would operate at a frequency of 199×360 or 71.640 kilocycles per second. As before, the range unit 28 is started running by the slow time base pulse former 26. At the same time, the fast time base 21 causes the transmitter 3 to send out the interrogation pulse from the beacon 19. However, each time the range counter 31 counts one cycle of the slow time base 24, the subdivision generator 29 will run through 360 subdivisions because each major unit of the slow time base 24 is divided into 360 subdivisions for the measurement of the independent variable, such as temperature. Thus, each time the counter 31 completes a count of one unit according to the slow time base, a start pulse is sent to the crystal oscillator 35, which in conjunction with the pulse former 36 causes the subdivision generator 29 to put out a train of pulses containing, in general, A pulses per second, in this case 360 pulses per subdivision, or 199 times 360 pulses equal to 71,640 pulses per second. The output of the subdivision generator 29 causes the independent variable counter 33 to count the subdivisions of each major interval and thereby measure the independent variable, such as temperature.

The beacon 19 also includes a receiver 9. It will be noted that the output 35′ of the receiver 9 is coupled to both the range counter 31 and to the independent variable counter 33. Thus, slow time base 24 starts the range counter 31 running as in FIG. 3. However, the subdivision generator is synchronized with the range counter 31 so that for each one count of the range counter 31, a number of subdivisions A, such as 360 subdivisions, is generated by the subdivision generator 29. In turn, the independent variable unit 30 totals up the number of subdivisions on the independent variable counter 33. When a reply pulse returns from the craft, it is received at receiver 9 and the output 35′ of receiver 9 causes both the range counter 31 and the independent variable counter 33 to stop at the same instant. At that instant, counter 31 will read the correct range corrected for any delay errors and the counter 33 will display the correct value of the indepedent variable, such as temperature, also corrected for any errors due to delay in the pulses. If the correction scheme for the delay had been omitted, the information concerning the second independent variable would be totally lost from pulse to pulse because the uncertainty in pulse position due to delay alone would wipe out the information containing the second variable. It will be noted in FIG. 4 that the counting unit 27 is a two-variable counting unit and the system of FIG. 4 can also be used for the simpler system, such as shown in FIG. 3, with only one variable such as range, to be transmitted. In that case, the subdivision generator 29, and the independent variable unit 30, are not needed and only the range counting unit 28 need be used. The rest of the system would be the same as shown in FIGS. 3 and 4 for a single variable system.

FIG. 5 shows transponder 20 which is required to work in cooperation with the beacon 19 shown in FIG. 4. The transponder 20 of FIG. 5 shows a receiver 12 coupled to a fast time base 36. A fast time base 36 may include a crystal controlled oscillator 37 and a pulse former 38. The construction and operation of the fast time base 36 can be exactly the same as the fast time base 21 or the slow time base 24. But it should be noted that the frequency of the crystal oscillator 37 should be exactly the same as that of the crystal oscillator 22 in the fast time base in FIG. 4, so that the counting in the fast time base is done at the same rate both in the beacon 19 and on the transponder 20. The output of fast time base 36 is a train of pulses at the rate of F pulses per data cycle, in this case 200 pulses per data cycle, as shown in curve b, FIG. 7. The system further includes a range counter 39 and a subdivision generator 40. The range counter unit 39 is started running by the fast time base 36 and it counts one unit for each complete pulse or each complete cycle of the fast time base 36. The subdivision generator 40 may contain a crystal controlled oscillator 41 and a pulse former 42. The subdivision generator 40 can be similar to the fast time base 36 or 21 in construction. However, the frequency of the crystal controlled oscillator 41 must be exactly the same as that of the crystal controlled oscillator 35 in the subdivision generator 29 in this sense: The crystal controlled oscillator 41 will produce A pulses or A cycles for each single count of the range counter 39. However, the subdivision generator 40 goes through one complete cycle of A pulses for each count of one in the range counter 39 due to the fast time base 36 so that the actual frequency of the crystal oscillator 41 is equal to F cycles per second times A cycles per second. In this case, frequency of the crystal oscillator 41 will be 200 cycles per second (F) times 360 cycles per second (A) equal to 72.000 kilocycles per second. This is due to the fact that in transponder 20 on the craft, the subdivision generator 40 must oscillate slightly faster because the fast time base generator 36 is controlling the range counter 39, whereas in the beacon 19 the subdivision generator 29 must make 360 cycles for each cycle of the slow time base generator 24 which makes 199 cycles per second. These differences in frequency are well within the limits of crystal controlled oscillators and are, in fact, at least an order of 10 below what can be accomplished by a crystal controlled oscillator so that there is no difficulty experienced because of the requirements on the frequency accuracy of the oscillators.

The transponder 20 further includes the range system 15 which is adapted to stop the range counter 39 at the appropriate count corresponding to the range of the craft at that instant. There is also included in the system an independent variable counter 43. The independent variable counter 43 is started by the subdivision generator 40 which, in turn, is started once at the end of each count of one cycle of the range counter 39. Thus, the range counter 39 causes the subdivision generator 40 to go through A cycles per one cycle on the range counter. In this case, the subdivision generator will go through 360 cycles for each one cycle of the range counter 39. Likewise, the counter 43 will count at the rate provided by the subdivision generator 40. Subdivision counter 43 is stopped at the appropriate subdivision corresponding to the value of the independent variable by an independent variable system 44. The independent variable system 44 consists of equipment required to measure the desired variable at the craft and to convert this measurement into a form suitable to stop the independent variable counter 43 when the counter 43 reaches the correct value. The independent variable system 44 does not in itself form part of the novelty of this invention. Here, temperature has been used as an example of the independent variable. It should be noted that the modulator 16 and transmitter 17 are caused to emit a reply pulse in a special way in this case. When the range counter 39 stops, it provides a stop pulse or a stop signal to one input 45 of the AND gate 46. The input 45 from the range counter alone will not cause the AND gate 46 to produce an output at its output terminal 47. However, while the output from the range counter 39 remains on the input 45, when the independent variable counter 43 reaches the correct count on the subdivision scale at that instant counter 43 is stopped and the independent variable counter 43 puts out an output introduced into the second input 48 of the AND gate 46. At the instant of coincidence of an input 45 from the range counter 39 and an input 48 from the independent variable counter 43, AND gate 46 provides an output on its output lead 47 which causes the modulator 16 to be keyed and the modulator 16 causes the transmitter 17 to emit a reply pulse. Thus, the pulse emitted by the transponder 20 has been correctly placed within a major division upon the fast time base scale and in addition, this pulse has been correctly placed at the appropriate subdivision within the particular major division at which it was emitted. Thus, this one pulse carries information of both range and of the second independent variable, such as temperature.

In summary, the complete operation of the system shown by the FIGURES 4 and 5 may now be reviewed. The fast time base 21 causes modulator 4 to key the transmitter 3 which emits a pulse from beacon 19. At the same time, the fast time base 21 causes the slow time base 24 to begin running, or counting, and the range counter 31 totalizes the units of the slow time base 24. For each count of one cycle or one pulse on the range counter 31, the subdivision generator 29 causes the independent variable counter 30 (temperature) to go through an appropriate number of subdivision cycles, such as 360. When the pulse sent from the beacon 19 reaches the transponder 20 on the craft, the receiver 12 produces an output pulse and starts the fast time base 36 running. The range counter 39 utilizes the pulses or cycles of the fast time base 36. At the same time, each count of one pulse or one cycle in the range counter 39 through subdivision generator 40 causes the independent variable counter 43 to go through an appropriate number of subdivisions, such as 360. When the count on the range counter 39 reaches an appropriate value, the range counter 39 is stopped by the ranging system 15. A fraction of the major time unit later, the independent variable counter 43 is stopped at the correct count for the value of the independent variable by the independent variable system 44. The stop pulse or stop signal from the range counter 39 occurs first at the input lead 45 of the AND gate 46. Then, a fraction of a major time unit later, a stop signal from the independent variable counter 43 appears at the second input 48 of the AND gate 46. At the coincidence of the two stop signals from the range counter 39 and the independent variable counter 43, the AND gate 46 provides an output on lead 47 which causes the modulator 16 to be keyed and thereby causes the transmitter 17 to emit an appropriate reply pulse. When this reply pulse is received at beacon 19 the counters 31 and 33 are stopped and give the correct value of range and the independent variable, corrected for delay.

Although we have described the above system of FIGURES 4 and 5 and FIGURE 3 with some specific examples for clarity, in relation to electromagnetic radiation, a review of the discussion and diagrams will show such a system will work equally well no matter what medium is used to convey the pulse communications, i.e. air or water, for example. It can also be seen that the automatic correction provided for the errors caused by delay has enabled one pulse to carry two discrete sets of information. This results in a great saving in bandwidth and in addition, there are further advantages which will be explained in conjunction with FIGURE 8. Prior art devices have been known which utilize two pulses transmitted by the craft back to the beacon to accomplish the same result that is achieved by the use of one pulse sent by the transponder 20 from the craft. In the prior art devices the first of the two pulses sent back from the craft serves as a pilot pulse or a reference pulse, and the second pulse conveys the information by the length of time it occurs after the pilot pulse. In such a two-pulse system, the delays do not have to be corrected because there is a reference pulse provided and since the reference pilot pulse and the information pulse will both be delayed an equal amount, their relative position in time is not affected and there is no correction required for delay. As has been mentioned, such a scheme doubles the required bandwidth which is normally highly undesirable because of the limited available bandwidths for communication systems particularly for use with mobile communication systems, such as air traffic control, etc. FIG. 3 showed a complete communication system suitable for measuring one variable, range, with substantially no error caused by propagation delays. FIGS. 4 and 5 showed another complete communication system suitable for transmitting two independent variables, one of which was range and the other of which could be any desired variable whatsoever.

It will now be shown that both of these systems of FIGS. 3, 4 and 5 can be used in the situation where there is one central beacon, such as 10 or 19, and there are a relatively large number of craft each of which carries a transponder, such as 11 or 20. FIG. 8 shows all the necessary modifications to form a beacon 49 which will operate simultaneously with a plurality of craft. One advantage of this system is that there need be no changes in the transponders 11 or the transponders 20 and they may be exactly the same in each of the plurality of craft. Only the beacon 49 need be modified as shown in FIG. 8. As in FIGS. 3 and 4, the beacon 49 has a transmitter 3 and modulator 4, a fast time base 5 and a slow time base 6. Also, a receiver 9 is arranged to receive the replies from the transponders on the craft. The modifications involved the additions of a plurality of counters each of which will display range or range and one independent variable, with each additional counter representing the range of one particular craft. Thus, a first counter 7 with associated display unit 8 is shown as before. However, there are a number of additional counters, such as 50, 51 with their associated respective displays 52 and 53. All of the counters 7, 50, and 51 will display range, but they will display the range of different individual craft which are sending in replies to the beacon 49. A method of discriminating replies from the several craft is performed with the aid of memory units 54 and 55 and the AND gates 56 and 57. The output of the receiver 9 is coupled to the first counter 7 as before and serves to stop the first counter when the first received reply from the craft is detected by the receiver 9. However, the output of the receiver 9 is also connected to the "set" input to the memory unit 54 and to one of the two inputs 58 of AND gate 56 and to one of the two inputs 63 of AND gate 57. The output of memory unit 54 is connected to the second input 59 of the AND gates 56. The output of the AND gate 56 is connected to the "set" input 61 of the memory unit 55. The output 62 of memory unit 55 is connected to one input of the AND gate 57. As mentioned before, the output of the receiver is also connected to 63, the second input of AND gate 57. The output 64 of AND gate 57 would be connected in like manner to the next succeeding memory unit and the system continues in the same scheme of connections. The memory units 54 and 55 may take a number of different forms, but a suitable simple form would be a bistable circuit, such as a flip flop circuit, constructed using either transistors, tubes, or magnetic cores, etc. The output of the modulator 4 is connected by lead 65 to the reset inputs of the memory units 54 and 55.

The scheme of operation with the beacon 49 is the same as that discussed in connection with FIGS. 3, 4, and 5. To review, a fast time base 5 causes the modulator 4 to key the transmitter 3 and send out an interrogation pulse to all the craft. At the same time, the fast time base 5 causes the slow time base 6 to commence running. Slow time base 6 causes all of the counters 7, 50, 51 and any additional counters to commence totalizing the units of the slow time base 6 so that the counters 7, 50 and 51, etc., will read exactly the same until the first pulse is received in reply from the craft. Each of the counters 7, 50, 51, etc. will be counting at the rate determined by the slow time base 6, or by the rate determined by the slow time base 24 in FIG. 4. For convenience, a counting unit can be considered a counter 7 plus its associated display equipment 8. Thus, counter 50 and display 52 are a counting unit 67 and the counter 51 and display 53 are a counting unit 68. FIG. 8 shows a single variable counting unit but two-variable counting unit 27, as shown in FIG. 4, can also be readily used in the same manner as will become apparent during the explanation. The manner in which the pulses segregate themselves can now be seen. When the beacon 49 sends out an interrogation pulse from the transmitter 3, this same pulse will be received by all the craft within range of the equipment and equipped with a transponder such as 11 or 20, shown in FIGS. 3 and 5. Each craft will in due time answer with a reply pulse. The time of occurrence of this reply pulse will depend upon two factors—the delay between the particular craft and the beacon and the range to the beacon. For a two-variable type of system, the time of occurrence of the reply will further depend upon the value of the independent variable.

The nearest craft will reply first and the reply pulse from the nearest craft will be received first. When the first reply pulse is detected by the receiver 9, the receiver 9 puts out a pulse which goes to a number of different places simultaneously. The reply pulse put out by the receiver 9 on the lead 69 goes to the stop input of the first counter 7 and stops that counter, the count representing the range of the first craft from the beacon 49. This operation is exactly as explained in conjunction with FIGS. 3 and 4. In addition, however, this same first reply pulse goes to the "set" input of the memory unit 54 by lead 70 and at the same instant that the counter 7 is stopped, the memory unit 54 is placed in the "set" condition. In the set condition, the memory unit 54 will have an output on its lead 59. In the reset condition, the output of memory unit 54 at point 59 is zero. At the instant that the pulse from receiver 9 was entering memory unit 54, this same pulse was entering the AND gate 56 by lead 58. However, a pulse on input 58 to the AND gate 56 does not effect the AND gate 56 because at that instant memory unit 54 is still in the reset state and there is no output on lead 59, so that there is no output from the AND gate 56 at point 60. Thus, at the instant the first reply pulse enters the AND gate 56 by lead 58, the memory unit is still in the reset condition and the AND gate does not have the required two inputs on leads 58 and 59 to produce an output at 60. Hence, the AND gate 56 has no output at point 60. However, this first reply pulse causes the memory unit 54 to enter the set state preparing the AND gate 56 for response to the next pulse. This same first pulse from receiver 9 also enters the AND gate 57 by lead 63. However, the AND gate 57 also produces no output at this instant at its output 64 because the memory unit 55 is in the reset state and hence, there is no output at point 62 from memory unit 55.

At some later time, the receiver 9 will receive a second pulse from the craft that is the next farthest away from the beacon. This pulse will have no effect on counter 7 which has already been stopped. This pulse will also have no effect upon the memory unit 54 which is already in the set state, but when this second pulse enters the AND gate 56 by means of its second input 58, the other input 59 to the AND gate 56 will now have the required input value because the memory unit 54 is in the set state and hence, there is an output at lead 60. Thus, when the second pulse enters AND gate 56 by lead 58, the AND gate 56 will produce an output pulse at point 60. This output pulse will stop the counter 50 at the appropriate range corresponding to the range of this second aircraft. Thus, the range of the second aircraft is made known. At the same time, the output from the AND gate 56 is coupled by lead 61 to the set input of the next memory unit 55, causing the memory unit 55 to go into the set state after the reception of the second pulse. It should be noted that the second pulse does not cause an output at the output of AND gate 57 because when the second pulse was received, the memory unit 55 had not yet flipped into the set state. However, the second pulse places the memory unit 55 in the set state with an output at lead 62.

At a still later time a reply from the craft which is next farther out in range from the beacon 49 will be received. This third pulse will have no effect on counter 7 or memory unit 54 and no effect on counter 50 because counters 50 and 7 are already stopped. However, when this third pulse enters AND gate 57 by input 63, the AND gate 57 will produce an output at point 64 because memory unit 55 has already been placed in the set state from the previous second pulse so that there is the required output at lead 62. Hence, the third pulse from receiver 9 produces an output at AND gate 57 at point 64. This output stops the count at the third counter 51 at the range corresponding to the third craft. At the same time, the output of the AND gate 57 by lead 64 is introduced into the set input of the next memory unit (which is not shown). Any number of craft can be accommodated in this manner by simply adding counters and memory units. For each additional counter and craft to be accommodated, one memory unit and one AND gate will be required and a method of connection is given completely as shown in FIG. 8. Thus, the range of each craft will be automatically segregated and placed on an appropriate counter by the successive reply pulses that occur from the craft. The scheme of FIG. 8 can be seen to be readily applied for use with the two-variable pulse system of FIGS. 4 and 5. Instead of using a counting unit such as 68, the two-variable counting unit such as 27 in FIG. 4 is substituted for the counting units 68, 67, and 66 in FIG. 8. The operation, otherwise, will be exactly the same. All that is required is one memory unit and one AND gate for each additional counting unit which is provided. In the two-speed counting unit, such as 27, the stop pulses from the receiver 9 are introduced into both counters within the two-variable counting unit 27. But this involves no additional equipment and no difficulties whatsoever. In the two-speed system to handle three craft, there would be a total of six counters, three counters for range and three counters for the independent variable of each of the three craft, and the system operation is as explained in connection with FIG. 8 and as shown under the discussion of FIG. 4.

It should be noted that the type of operation explained in FIG. 8 is not possible with the prior art two-pulse systems unless the pulses are specially coded in some manner. With the two-pulse communication system, such as the prior devices, the beacon 49 would be entirely unable to distinguish which pulses should be used as pairs when a number of pulses arrive from craft at different ranges. Thus, the present invention presents a novel method of utilizing a single pulse, time modulation system to provide communication of one or two independent variables utilizing only a single pulse sent to the beacon from each craft. It may also be pointed out that the beacon 10 or 19 or 49 need not be stationary. The beacon itself may be mounted upon a movable craft, such as a naval ship or another aircraft, for example, and the system will work equally well under those conditions.

While we have described above the principles of our invention in connection with specific apparatus, it is to be clearly understood that this description is made by way of illumination and not as a limitation to the scope of our invention as set forth in the objects thereof and in the accompanying claims.

We claim:

1. A communication system comprising a beacon and at least one remotely located transponder, said beacon comprising first transmitting means for sending interrogation pulses and responsive to reply pulses from said transponder, beacon time measuring means operating at a first rate synchronized to said transmitting means, said transponder comprising transponder time measuring means operating at a different rate from said first rate and responsive to said interrogation pulses, and second transmitting means controlled by said transponder time measuring means for sending said reply pulses at said different rate conveying information whereby the propagation delay of both said pulses is incorporated in the information transmitted without affecting the integrity of said information.

2. A system for transmission delay compensation in telemetering between a central station and at least one remotely located station comprising a beacon located at said central station and a transponder carried by said remote station, said beacon comprising means to generate a signal at a first frequency, means to generate a signal at a second frequency lower than said first frequency and synchronized to said first frequency signal, means responsive to said first frequency signal to transmit first pulse signals at a predetermined time, said transponder comprising means to receive said first pulse signals and means responsive to said first pulse signals to transmit second pulses at said first frequency conveying desired information, and said beacon further comprises a receiver responsive to said second pulses and at least one counter responsive to said second frequency signal to start operation thereof and the output of said receiver to stop operation thereof whereby the output of said counter represents the desired information free from the error producing effect of time delay in the transmission of said first and second pulses.

3. A system for transmission delay compensation in telemetering between a central station and at least one remotely located station comprising a beacon located at said central station and a transponder carried by said remote station, said beacon comprising first means to generate a signal at a first frequency, second means to generate a signal at a second frequency lower than said first frequency signal and synchronized to said first frequency signal, means responsive to said first frequency signal to transmit first pulses at a predetermined time, said transponder comprising third means to generate a signal at said first frequency, a first receiver responsive to said first pulses to trigger said third means, a first counter responsive to said first frequency signal from said third means to start operation thereof and responsive to a signal containing desired information to stop operation thereof, means coupled to the output of said first counter to transmit second pulses at said first frequency conveying said desired information, said beacon further comprising a second receiver responsive to said second pulses, and a second counter responsive to said second frequency signal from said second means to start operation thereof and the output of said receiver to stop operation thereof whereby the output of said second counter represents said desired information free from the error producing effect of time delay in the transmission of said first and second pulses.

4. In a system for transmission delay compensation in telemetering between a central station and at least one remotely located station with a beacon located at said central station and a transponder carried by each remote station, said transponder comprising a receiver responsive to first pulses sent from said beacon, means to generate a signal at a first frequency responsive to the output of said receiver, means for counting at the rate of said first frequency signal, said counting means being responsive to said first frequency signal to start operation thereof and to the value of desired information to be transmitted to said central station to stop operation thereof, a transmitter coupled to the output of said counting means for sending second pulses at said first frequency conveying said desired information whereby the delay due to propagation of said first and second pulses is incorporated in said desired information transmitted by both said pulses without affecting the integrity of said information.

5. In a system for delay compensation in telemetering between a plurality of remote points and a central point with a beacon located at said central point and a transponder located at each said remote point, said beacon comprising means for generating a fast time base, means for generating a slower time base synchronized to said fast time base, a first transmitter for sending interrogation pulses at the rate of said fast time base, a first receiver responsive to reply pulses from each said transponder, first counting means controlled by the output of said slow time base to start operation thereof, means for generating subdivisions of said slow time base controlled by the output of said first counting means, second counting means to start operation thereof controlled by the output of said subdivision generating means, means coupling the output of said receiver to said first counting means and said second counting means to stop operation thereof, said transponder comprising a second receiver responsive to said interrogation pulses, means for generating said fast time base responsive to the output of said second receiver, a first counter responsive to the output of said fast time base to start operation thereof and responsive to a first independent variable signal to stop operation thereof, means for generating subdivisions of said fast time base coupled to the output of said first counting means, second counting means responsive to the output of said subdivision generating means to start operation thereof and responsive to a second independent variable signal to stop operation thereof, a conjunction organ responsive to the outputs of said first and said second counting means, and a second transmitter responsive to the output of said conjunction organ whereby information concerning the said two independent variables may be conveyed by each reply pulse sent from said transponder and decoded by said beacon and the propagation delays conveyed by said interrogation and reply pulses are incorporated in the information transmitted by said transponder without affecting the integrity of said information.

6. In a system for delay compensation in telemetering between a plurality of remote points and a central point with a beacon located at said central point and a transponder located at each said remote point, said beacon comprising means for generating a fast time base, means for generating a slower time base synchronized to said fast time base, a transmitter for sending interrogation pulses at the rate of said fast time base, a receiver responsive to reply pulses from each said transponder, first counting means controlled by the output of said slow time base to start operation thereof, means for generating subdivisions of said slow time base controlled by the output of said first counting means, second counting means to start operation thereof controlled by the output of said subdivision generating means, means coupling the output of said receiver to said first counting means and said second counting means to stop operation thereof whereby information conveyed by each reply pulse received by said beacon concerning two independent variables are derived by said first and second counting means and the propagation delay conveyed by said interrogation pulses and said reply pulses are incorporated in the information contained in said reply pulses without affecting the integrity of said information.

7. In a system for delay compensation in telemetering between a plurality of remote points and a central point with a beacon transmitting interrogation pulses located at said central point and a transponder located at each said remote point, said transponder comprising a receiver responsive to said interrogation pulses, means for generating a fast time base responsive to the output of said receiver, a first counter responsive to the output of said fast time base to start operation thereof and responsive to a first independent variable signal to stop operation thereof, means for generating subdivisions of said fast time base coupled to the output of said first counting means, second counting means responsive to the output of said subdivision generating means to start operation thereof and responsive to a second independent variable signal to stop operation thereof, a conjunction organ responsive to the outputs of said first and said second counting means, and a transmitter responsive to the output of said conjunction organ whereby information concerning the said two independent variables may be conveyed by each reply pulse sent from said transponder and the propagation delays conveyed by said interrogation and reply pulses are incorporated into the information transmitted by said transponder without affecting the integrity of said information.

8. In a system for transmission delay compensation in telemetering between a central station and at least one remotely located station, comprising a beacon located at said central station transmitting first pulses at a first frequency and a transponder carried by each said remotely located station, said transponder comprising a receiver responsive to said first pulses, first means to generate said signal at a first frequency responsive to the output of said receiver, first counting means responsive to the output of said first generating means to start operation thereof and operating at a rate determined by said first frequency signal, said first counting means being further responsive to the value of first desired information to be transmitted to said central station to stop operation thereof, means responsive to said first counting means for generating subdivisions of said first frequency signal, second counting means responsive to the output of said subdivision generating means to start operation thereof and operating at a rate controlled by the output of said subdivision generating means, said second counting means being responsive to second desired information to be transmitted to said central station to stop operation thereof, a conjunction organ responsive to both the outputs of said first and second counting means, a transmitter coupled to the output of said conjunction organ whereby said transmitter is caused to emit second pulses at said first frequency at times determined by the conjunction of the outputs of said first and second counting means so that the delay in propagation of said first and second pulses is incorporated into said information transmitted without affecting the integrity of said information.

9. A system for transmission delay compensation in telemetering between a central station and at least one remotely located station comprising a beacon located at said central station and a transponder carried by each said remote station, said beacon comprising first means to generate a signal at a first frequency, second means to generate a signal at a second frequency slower than said first frequency signal and synchronized to said first frequency signal, means responsive to said first frequency signal to transmit first pulse signals at a predetermined time, said transponder comprising means to receive said first pulses and means responsive to said first pulses to transmit second pulses at said first frequency conveying desired information of first and second independent variables, said beacon further comprising a receiver responsive to said second pulses from said transponder, a first counter responsive to said second frequency signal to start operation thereof and the output of said receiver to stop operation thereof, third means to generate a third signal at a frequency that is a multiple of said second frequency signal, means coupling the output of said first counter to said third means, second counting means coupled to the output of said third means and responsive to said third frequency signal to start operation thereof and the output of said receiver to stop operation thereof, whereby the output of said first counter represents desired information of said first independent variable and the output of said second counter represents desired information of said second independent variable and said desired information conveyed by said second pulses incorporates the progagation delay of said first and second pulses in the information transmitted wtihout affecting the integrity of said information.

10. A system for transmission delay compensation in telemetering between a central station and a plurality of remotely located stations comprising a beacon located at said central station and transponder carried by each said remotely located station, said beacon comprising first means to generate a signal at a first frequency, second means to generate a signal at a second frequency slower than said first frequency signal and synchronized to said first frequency signal, means responsive to said first frequency signal to transmit first pulse signals at predetermined times, each said transponder comprising means to receive said first pulse signals and means responsive to said first pulse signals to transmit second pulses at said first frequency containing desired information, said beacon further comprising a receiver responsive to said second pulses from said transponders, a first counting means responsive to said second frequency signal to start operation thereof and the output of said receiver to stop operation thereof to produce an output indicative of information transmitted by a first one of said transponders, a plurality of groups, each said group comprising counting means, storage means, and a conjunction organ, and for each group means to start operation thereof coupling the output of said second frequency signal to said counting means, means coupling the output of said receiver to said storage means and said conjunction organ, means coupling the output of said storage means to said conjunction organ, means coupling the output of said conjunction organ to said counting means and to the storage means of the next succeeding group whereby the output of each counting means of each said group represents information transmitter by a discrete one of said plurality of transponders other than said first one whereby the propagation delay of said first pulses transmitted by said beacon and said second pulses transmitted by said transponders is incorporated in the information conveyed by both said pulses without affecting the integrity of said information and the information transmitted by each transponder is indicated by the counting means of a discrete one of said group.

References Cited in the file of this patent
UNITED STATES PATENTS 2,664,561    McIlwain _____ Dec. 29, 1953